W. P. HICKOK.
STRIP CUTTING AND FORMING MACHINE.
APPLICATION FILED OCT. 28, 1908. RENEWED MAR. 9, 1916.

1,178,805.

Patented Apr. 11, 1916.
2 SHEETS—SHEET 1.

W. P. HICKOK.
STRIP CUTTING AND FORMING MACHINE.
APPLICATION FILED OCT. 28, 1908. RENEWED MAR. 9, 1916.
1,178,805.  Patented Apr. 11, 1916.
2 SHEETS—SHEET 2.
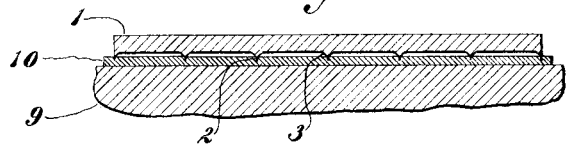
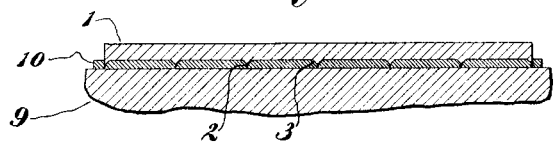
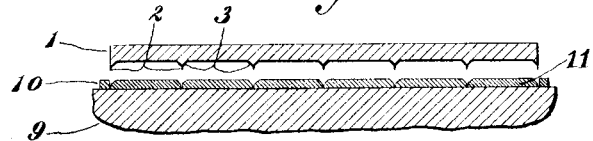
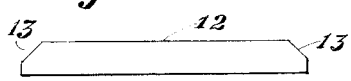
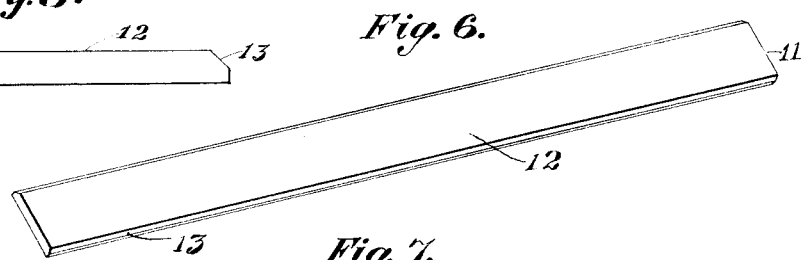
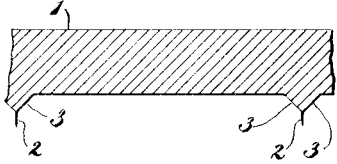
Witnesses:
William H. Irish.
Katharine Sexton
Inventor,
W. P. Hickok
By John D. Morgan
Attorney.
THE COLUMBIA PLANOGRAPH CO., WASHINGTON, D. C.

UNITED STATES PATENT OFFICE.

WILLIAM P. HICKOK, OF MOUNT VERNON, NEW YORK.

STRIP CUTTING AND FORMING MACHINE.

1,178,805.  Specification of Letters Patent.  Patented Apr. 11, 1916.

Application filed October 28, 1908, Serial No. 459,854. Renewed March 9, 1916. Serial No. 83,173.

*To all whom it may concern:*

Be it known that I, WILLIAM P. HICKOK, a citizen of the United States, and residing at Mount Vernon, in the county of Westchester and State of New York, have invented a certain new and useful Strip Cutting and Forming Machine, of which the following is a specification.

The invention relates to devices for cutting a sheet of material into strips and molding or beveling the face of the strip along the cut edges.

Objects of the invention are to provide a device which so cuts and molds or bevels at a single operation, and in certain aspects of the invention a device which is suitable for operating upon a material which is arranged in plies such as card-board and which may have a surface ply of highly finished material, such as super-calendered paper, the device acting to leave the surface ply over the molded or beveled portion, and thus presenting the same appearance thereon as upon the face.

Figure 1:
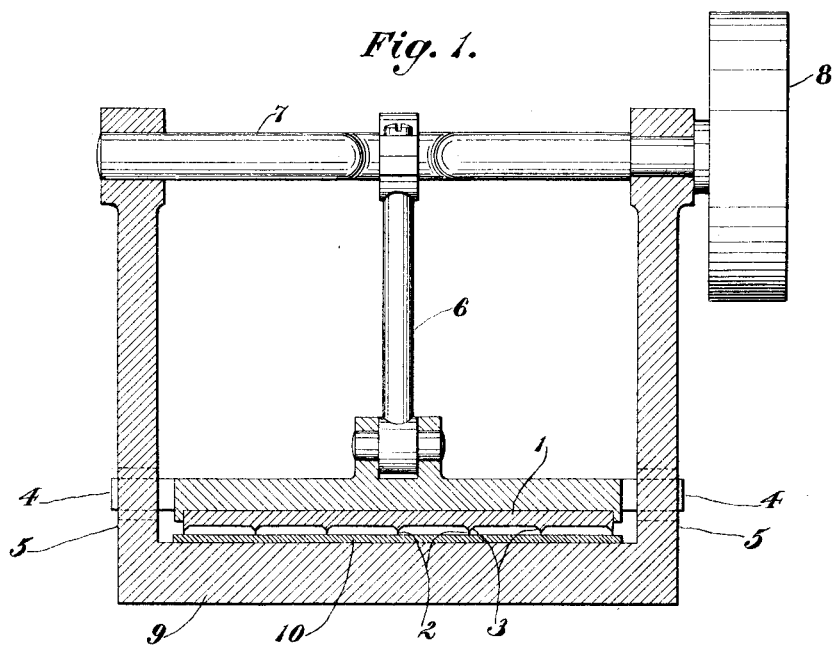
Figure 2:
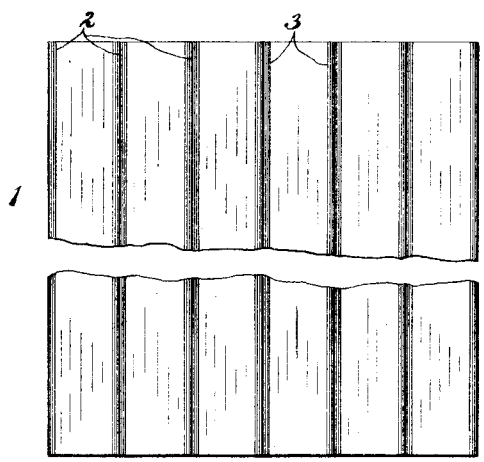

Of the drawings: Figure 1 is a view in elevation illustrating a mechanism parts of which embody the principles of invention; Fig. 2 is a bottom plan view of the cutting and forming device; Fig. 3 is a view of parts shown in Fig. 1 at one stage of operating upon the material; Fig. 4 is a view of the same parts at a different stage of operating upon the material; Fig. 5 shows the cutting and molding device after the operation upon the material is completed; Fig. 6 shows one of the completed strips which are the product of the machine; Fig. 7 is a fragmentary view on a larger scale of the cutting and forming device; and Fig. 8 is an enlarged end view of such a strip as is shown in Fig. 6.

Referring to the drawings herewith a device operated by power is shown, illustrating the principles of the invention, although such a device may be constructed which is manually operable.

In the accompanying drawings a cutting and forming device 1 is shown provided with cutting means for separating a sheet of material into strips, the said cutting means being shown herein as comprising a plurality of knives 2 arranged parallel to each other. In connection with the cutting means there are shown means for compressing the face of the strip along the cutting edge so as to give a portion along said edge which is molded with respect to the face. In the illustrated form thereof, a beveled portion 3 is shown adjacent to a knife 2 and arranged so that as the knife 2 cuts down through the material in a direction parallel to the faces of the sheet of material, the portion 3 will come in contact with the cut edge and mold or compress it at a bevel or angle to the face. The surfaces 3 are shown herein as being arranged longitudinally along the knives 2, parallel to the knives and parallel to each other. The said knives and molding surfaces may be arranged in gangs of any desired number and as shown herein two molding surfaces 3 are shown arranged between two knives so that as a strip is cut off from the material by the two knives it is held firmly in position as the cutting proceeds and the two molding surfaces 3 come down thereon and bevel the edges.

As shown herein the device 1 is provided with guides 4 working on ways 5 to give a reciprocatory motion to the device 1. Pivoted links 6 are shown connecting the device 1 to a crank shaft 7 which may be driven from a suitable source of power by any convenient means such as a belt pulley 8. A support 9 for the material to be operated upon is also shown. It will be understood, however, that the main features of the invention, as set forth in the claims herewith, are independent of the constructions just described.

In Fig. 3 of the drawings the device 1 is shown as the cutting operation alone is being performed upon the material 10. In Fig. 4 of the drawings the device is shown in such relation to the material that the cutting and compressing operations are just completed, or nearing completion. In Fig. 5 of the drawings the device 1 is shown free of the material, the material having been cut into strips 11 with the edges 13 of the face 12 molded or beveled as shown in Figs. 6 and 8 of the drawings.

The manner of operation of the invention will be understood from the foregoing description, and it will be seen also that the structure provided realizes the objects of invention and the advantages herein set forth together with other objects and advantages.

It will be understood that when the material operated on is multi-ply card-board, that the surface layer is molded or compressed over the beveled edges 13, so that the surface 12 and the surfaces 13 are of the same appearance and texture. Such slips are useful in the changeable directories which are hung up in the foyers or walls of public buildings to indicate where the various persons may be found in the different parts of the building. The device and the product may also have other uses.

What I do claim as my invention and desire to secure by Letters Patent, is:

1. A device for cutting cardboard sheets into strips and molding the cut strips, said device comprising in combination a flat bed upon which the sheet is laid, and a member movable to and from said bed, said member being provided with a thin, straight blade for cutting down through the material, a beveled surface arranged longitudinally of said blade and joining on thereto for compressing the cardboard along the straight edge of the cut, after the cut has been made by the blade to bevel a portion only of the depth of the cut and leaving the surface of the cardboard upon said beveled portion.

2. A device for cutting cardboard sheets into strips and molding the strips, said device comprising in combination a flat bed upon which the sheet is laid, a member movable to and fro relatively to said bed, said member being provided with a plurality of thin, straight blades for cutting said sheet as it rests upon said bed, said blades being arranged parallel to each other and substantially in a plane, and beveled surfaces arranged longitudinally to and joining said blades at a distance from their cutting edges, whereby the cardboard strip between two adjacent blades is compressed along the straight edge of the cut formed by the blade to form a bevel for a portion of the depth of the cut while preserving the surface of the cardboard upon said beveled portion.

3. A device for cutting into strips a sheet of cardboard or other compressible material comprising in combination a support for a sheet of the material to be cut, a support for a plurality of blades, a plurality of thin, straight blades carried by said support and arranged parallel to each other, a beveled surface arranged longitudinally of a blade, away from the edge of said blade, and on the side thereof toward another blade, whereby the material along the straight edge of the cut formed by said blade is compressed to a bevel for a portion of the depth of said cut, while the cut strip of material is confined between the two blades, and means for moving one of said supports toward and from the other.

In testimony whereof, I have signed my name to this specification, in the presence of two subscribing witnesses.

WILLIAM P. HICKOK.

Witnesses:
HENRY C. WAGNER,
J. O. DALTON.

Copies of this patent may be obtained for five cents each, by addressing the "Commissioner of Patents, Washington, D. C."